US010146027B2

(12) United States Patent
Ito

(10) Patent No.: US 10,146,027 B2
(45) Date of Patent: Dec. 4, 2018

(54) LENS BARREL

(71) Applicant: Panasonic Intellectual Property Management Co., Ltd., Osaka (JP)

(72) Inventor: Daisuke Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/023,073

(22) PCT Filed: Jun. 12, 2014

(86) PCT No.: PCT/JP2014/003121
§ 371 (c)(1),
(2) Date: Mar. 18, 2016

(87) PCT Pub. No.: WO2015/049813
PCT Pub. Date: Apr. 9, 2015

(65) Prior Publication Data
US 2016/0209622 A1 Jul. 21, 2016

(30) Foreign Application Priority Data
Oct. 4, 2013 (JP) ................................. 2013-208743

(51) Int. Cl.
*G02B 15/14* (2006.01)
*G02B 7/10* (2006.01)
(Continued)

(52) U.S. Cl.
CPC ................. *G02B 7/10* (2013.01); *G02B 7/08* (2013.01); *G02B 7/102* (2013.01); *G03B 17/14* (2013.01)

(58) Field of Classification Search
CPC . G02B 7/102; G02B 7/10; G02B 7/04; G02B 7/08; G02B 15/14; G02B 7/022;
(Continued)

(56) References Cited

U.S. PATENT DOCUMENTS

| 5,485,315 A | * | 1/1996 | Nomura | ................. G02B 7/102 359/699 |
| 2011/0026136 A1 | * | 2/2011 | Katano | ................. G02B 7/021 359/700 |

FOREIGN PATENT DOCUMENTS

| JP | 7-120651 | 5/1995 |
| JP | 2006-220795 | 8/2006 |

(Continued)

OTHER PUBLICATIONS

JPO 2007-033796 Machine translation.*
International Search Report of PCT application No. PCT/JP2014/003121 dated Sep. 9, 2014.

*Primary Examiner* — Evan P Dzierzynski
*Assistant Examiner* — Sharrief Broome
(74) *Attorney, Agent, or Firm* — Wenderoth, Lind & Ponack, L.L.P.

(57) ABSTRACT

In a lens barrel and an imaging apparatus, improvement in impact resistance and size reduction can be enhanced. The lens barrel includes the following elements; a guide frame including a rotation restricting rib; a first group frame; and a second group frame. The first group frame includes a first guide part engaged outside the rotation restricting rib. The relative rotation of the first frame is restricted by the rotation restricting rib and the first group frame is capable of moving along the optical axis direction. The second group frame includes a second guide part engaged inside the rotation restricting rib. The relative rotation of the second frame is restricted by the rotation restricting rib and the second group frame is capable of moving along the optical axis direction.

(Continued)

A cam pin is formed on the outer peripheral surface of the first group frame and engages a cam cylinder disposed on the outer periphery of the first group frame.

7 Claims, 13 Drawing Sheets

(51) Int. Cl.
    *G02B 7/08*           (2006.01)
    *G03B 17/14*        (2006.01)

(58) Field of Classification Search
    CPC ........ G02B 7/023; G02B 7/026; G02B 7/021;
              G02B 13/009; G02B 7/02; G02B 13/06;
              G02B 13/16; G02B 15/10; G02B 15/161;
              G02B 15/173; G02B 15/177; G02B 23/14
    See application file for complete search history.

(56) References Cited

FOREIGN PATENT DOCUMENTS

| | | | | |
|---|---|---|---|---|
| JP | 2007-033796 | * | 2/2007 | ............... G02B 7/04 |
| JP | 2009-128472 | | 6/2009 | |
| JP | 2009-134160 | | 6/2009 | |
| JP | 2012-042684 | | 3/2012 | |

* cited by examiner

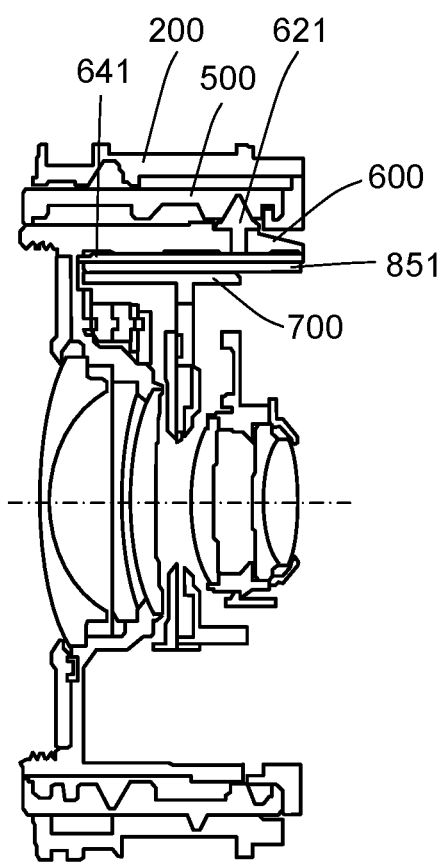

LENS BARREL

TECHNICAL FIELD

The present disclosure relates to a lens barrel for use in an imaging apparatus.

DESCRIPTION OF THE RELATED ART

Patent Literature 1 discloses a lens barrel in which improvement in impact resistance and size reduction can be achieved. The lens barrel of Patent Literature 1 is configured so that "engagement wall 4f of movable frame 4 and projection 3e of rotary frame 3 that form a bayonet connection part are deformed in a direction to bite into each other." Thus, in the lens barrel, "the bayonet connection between movable frame 4 and rotary frame 3 can ensure prevention of disengagement."

CITATION LIST

Patent Literature

PTL 1: Japanese Patent Unexamined Publication No. 2009-134160

SUMMARY

The present disclosure provides a lens barrel in which improvement in impact resistance and size reduction can be achieved.

A lens barrel of the present disclosure includes the following elements: a guide frame provided with a rotation restricting rib; a first group frame; and a second group frame. The first group frame includes a first guide part engaged outside the rotation restricting rib. The relative rotation of the first frame is restricted by the rotation restricting rib and the first group frame is capable of moving along the optical axis direction. The second group frame includes a second guide part engaged inside the rotation restricting rib. The relative rotation of the second frame is restricted by the rotation restricting rib and the second group frame is capable of moving along the optical axis direction.

An imaging apparatus has the above lens barrel formed integrally or removably.

In the lens barrel of the present disclosure, improvement in impact resistance and size reduction can be achieved.

BRIEF DESCRIPTION OF DRAWINGS

FIG. 9A is a schematic view showing a section along the optical axis direction in FIG. 7 in the state in which lenses are stored.

DETAILED DESCRIPTION

Hereinafter, exemplary embodiments will be detailed with reference to the accompanying drawings as needed. However, unnecessarily detailed description may be omitted. For instance, the detailed description of a matter that is already well known and the description of substantially identical elements may be omitted. This is to avoid the following description from being excessively redundant and to help those skilled in the art easily understand the present disclosure.

The inventor provide the accompanying drawings and the following description to help those skilled in the art sufficiently understand the present disclosure. The drawings and the description are not intended to limit the subject matter described in the scope of the claims.

First Exemplary Embodiment

Hereinafter, the first exemplary embodiment is described with reference to FIG. 1 through FIG. 11. In the first exemplary embodiment, as an example of the lens barrel, an interchangeable lens is described. A lens barrel includes a barrel integrally disposed on an imaging apparatus such as a digital still camera, and an interchangeable lens removably disposed on imaging apparatuses such as a single-lens reflex camera and a mirrorless camera.

[1. Configuration of Interchangeable Lens (FIG. 1 through FIG. 6B)]

Figure 1:
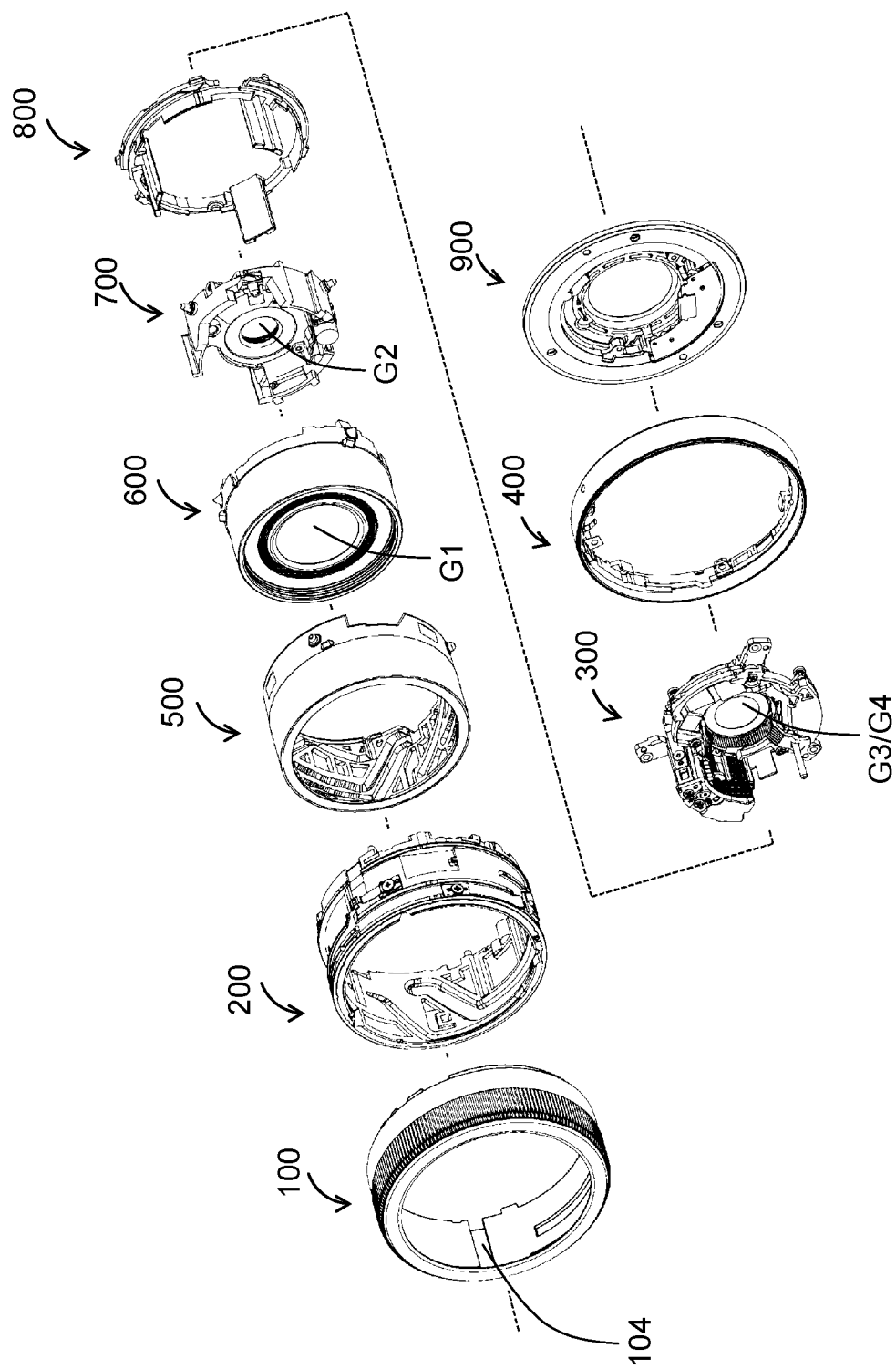
FIG. 1 is an exploded perspective view of a lens barrel in accordance with a first exemplary embodiment.

FIG. 1 is an exploded perspective view of an interchangeable lens. The interchangeable lens includes first lens group G1 through fourth lens group G4.

The interchangeable lens includes the following elements: zoom ring 100; fixed frame 200; cam cylinder 500; first group lens unit 600 including first lens group G1; second group lens unit 700 including second lens group G2; ¾ group lens unit 300 including third lens group G3 and fourth lens group G4; rotation restricting frame 800; rear frame 400; and lens mount 900. The interchangeable lens is connected to a camera body via lens mount 900 so as to form an imaging apparatus.

Zoom ring 100 is disposed on the outer peripheral side of fixed frame 200. Zoom ring 100 is rotatable relative to fixed frame 200. As shown in FIG. 1, zoom ring 100 has zoom drive groove 104 formed in the inner periphery thereof. Zoom drive groove 104 is a groove substantially parallel to the optical axis.

Figure 2:
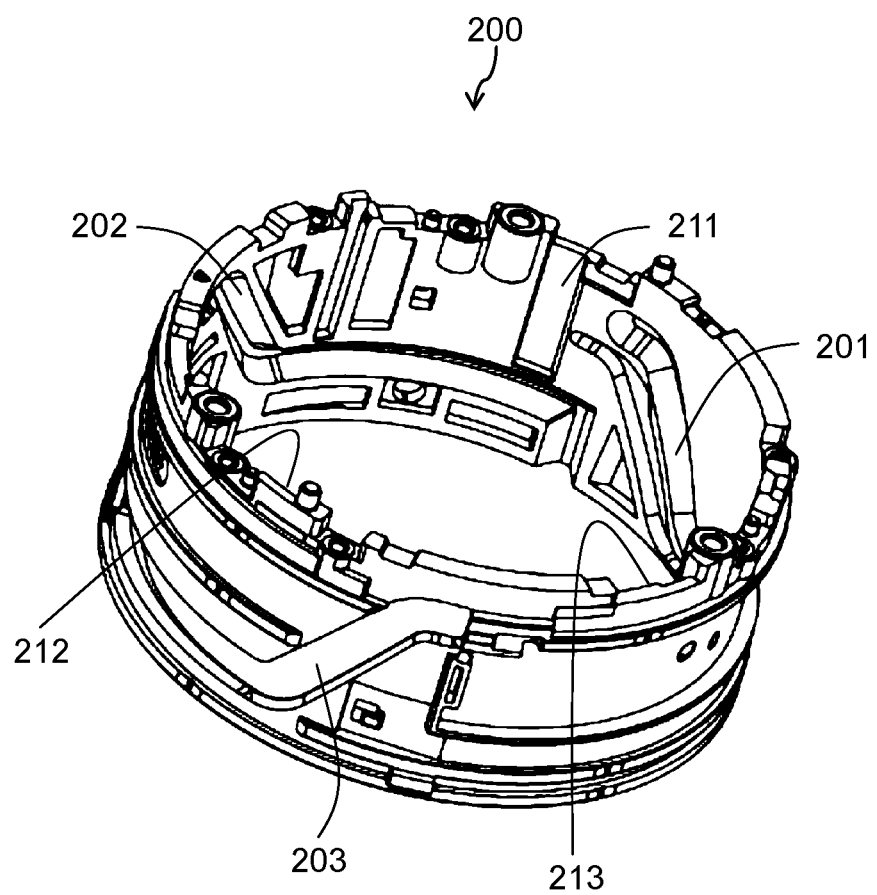
FIG. 2 is a perspective view of fixed frame 200 in accordance with the first exemplary embodiment.

FIG. 2 is a perspective view of fixed frame 200 as seen from the lens mount 900 side. Fixed frame 200 has first cam groove 201, second cam groove 202, and through cam groove 203 disposed on the inner periphery of the fixed frame. Through cam groove 203 penetrates from the inner periphery to the outer periphery of fixed frame 200. On the inner periphery, fixed frame 200 has fixed frame rotation restricting groove 211, fixed frame rotation restricting groove 212, and fixed frame rotation restricting groove 213 each having a fixed width and formed substantially parallel to the optical axis. As shown in FIG. 2, first cam groove 201, second cam groove 202, and through cam groove 203 are disposed in the positions where the peripheral direction is substantially equally divided into three phases.

Figure 3:
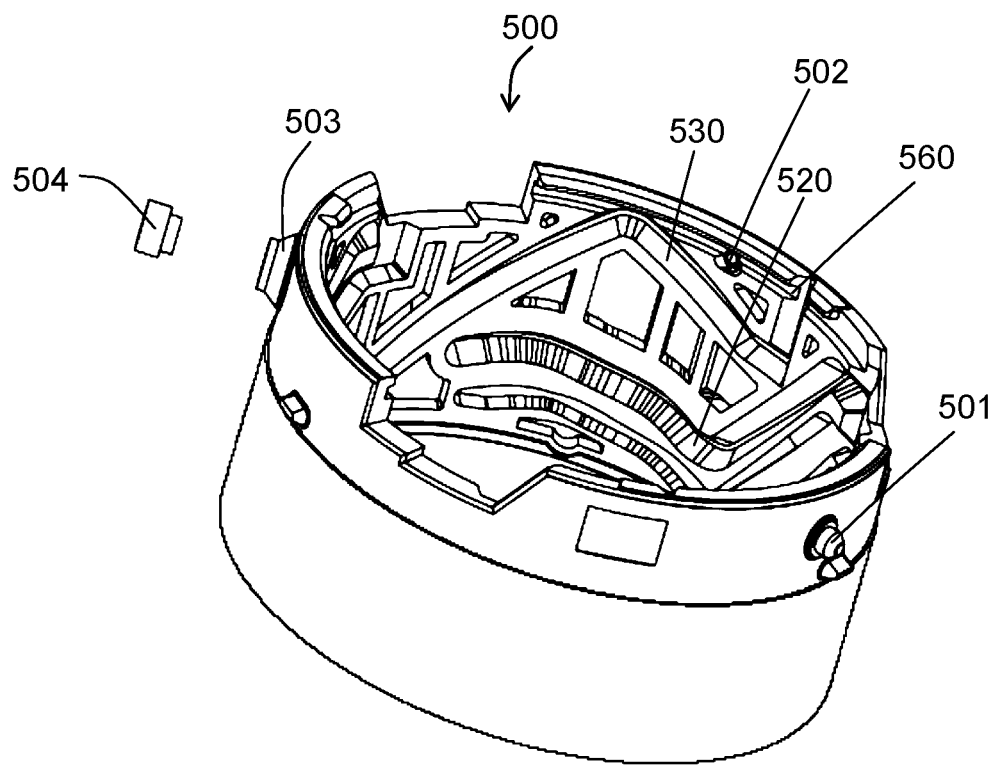
FIG. 3 is a perspective view of cam cylinder 500 in accordance with the first exemplary embodiment.

FIG. 3 is a perspective view of cam cylinder 500 as seen from the lens mount 900 side. On the inner periphery, cam cylinder 500 includes three third cam grooves 520, three fourth cam grooves 530, and three bayonet grooves 560 that engage rotation restricting frame 800. Each of three third cam groves 520, each of three fourth cam grooves 530, and each of three bayonet grooves 560 are disposed in the positions where the peripheral direction is substantially equally divided into three phases.

On the outer periphery of cam cylinder 500, first cam pin 501, second cam pin 502, and through cam pin 503 are fixed by press-fitting, for example.

First cam pin 501 of cam cylinder 500 engages first cam groove 201 of fixed frame 200, and second cam pin 502 engages second cam groove 202 of fixed frame 200. Through cam pin 503 of cam cylinder 500 engages through cam groove 203 of fixed frame 200. Through cam pin 503 has a diameter larger than those of first cam pin 501 and second cam pin 502. Zoom drive pin 504 is fixed, by screwing, to the top face of through cam pin 503 in the state in which through cam pin 503 engages through cam groove 203.

Here, zoom drive pin 504 projects toward the outer peripheral side farther than the outer peripheral surface of fixed frame 200. Zoom drive pin 504 engages zoom drive groove 104 of zoom ring 100. With this configuration, when zoom ring 100 is rotated around the optical axis by the operation of the user, for example, cam cylinder 500 rotates around the optical axis via zoom drive pin 504. As a result, first cam pin 501, for example, moves along first cam groove 201, for example; thereby cam cylinder 500 moves relative to fixed frame 200 along the optical axis direction while rotating relative to the fixed frame around the optical axis. When cam cylinder 500 moves along the optical axis direction, zoom drive pin 504 continues to engage zoom drive groove 104.

Figure 4:
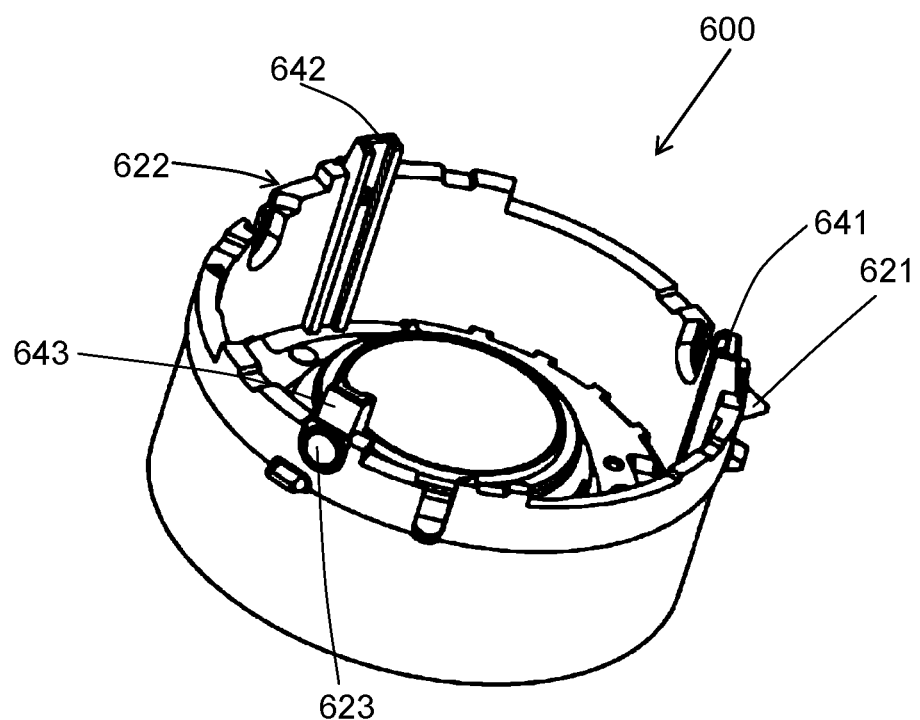
FIG. 4 is a perspective view of first group lens unit 600 in accordance with the first exemplary embodiment.

FIG. 4 is a perspective view of first group lens unit 600 as seen from the lens mount 900 side. On the inner periphery, first group lens unit 600 has first group rotation restricting rib 641, first group rotation restricting rib 642, and first group rotation restricting rib 643 each having a fixed width and formed substantially parallel to the optical axis. Part of each of first group rotation restricting ribs 641, 642, 643 projects from the image surface side of first group lens unit 600. On the end side of the outer periphery of first group lens unit 600, third cam pin 621, third cam pin 622, and third cam pin 623 are fixed by press-fitting, for example. Third cam pins 621, 622, 623 form pairs with first group rotation restricting ribs 641, 642, 643, respectively, and each pair is fixed in the positions opposite to each other. In other words, third cam pins 621, 622, 623 are substantially in phase with first group rotation restricting ribs 641, 642, 643, respectively, in the peripheral direction. First group rotation restricting ribs 641, 642, 643 are examples of guide parts.

Third cam pins 621, 622, 623 engage three third cam grooves 520, respectively, in cam cylinder 500. Thus, first group lens unit 600 moves relative to cam cylinder 500 along the optical axis direction while rotating relative to the cam cylinder around the optical axis.

Figure 5:
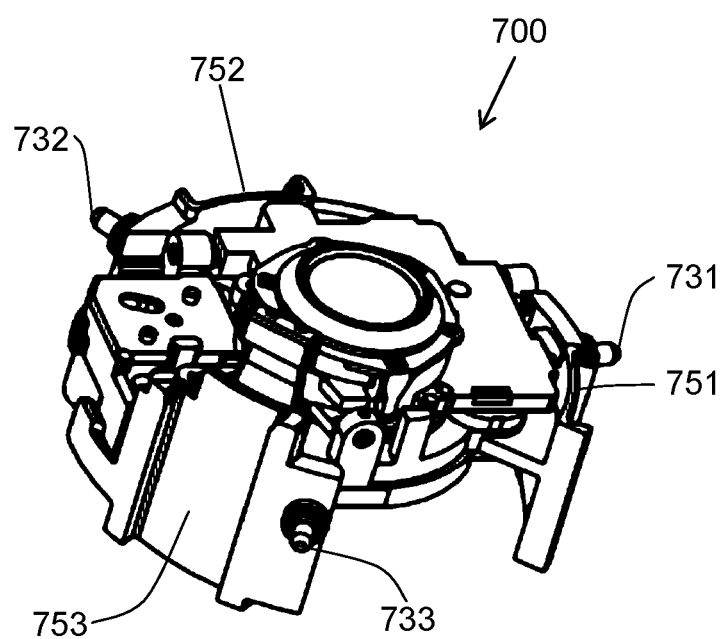
FIG. 5 is a perspective view of second group lens unit 700 in accordance with the first exemplary embodiment.

FIG. 5 is a perspective view of second group lens unit 700 as seen from the lens mount 900 side. On the outer periphery, second group lens unit 700 has second group rotation restricting groove 751, second group rotation restricting groove 752, and second group rotation restricting groove 753 each having a fixed width and formed substantially parallel to the optical axis. On the outer periphery of second group lens unit 700, fourth cam pin 731, fourth cam pin 732, and fourth cam pin 733 are fixed by press-fitting, for example. Fourth cam pins 731, 732, 733 are disposed on the wall of second group lens unit 700 that form second group rotation restricting grooves 751, 752, 753, respectively, and are disposed in the vicinity of second group rotation restricting grooves 751, 752, 753, respectively. Fourth cam pins 731, 732, 733 engage three fourth cam grooves 530, respectively, in cam cylinder 500. Thus, second group lens unit 700 moves relative to cam cylinder 500 along the optical axis direction while rotating relative to the cam cylinder around the optical axis. Second group rotation restricting grooves 751, 752, 753 are examples of guide parts.

Figure 6A:
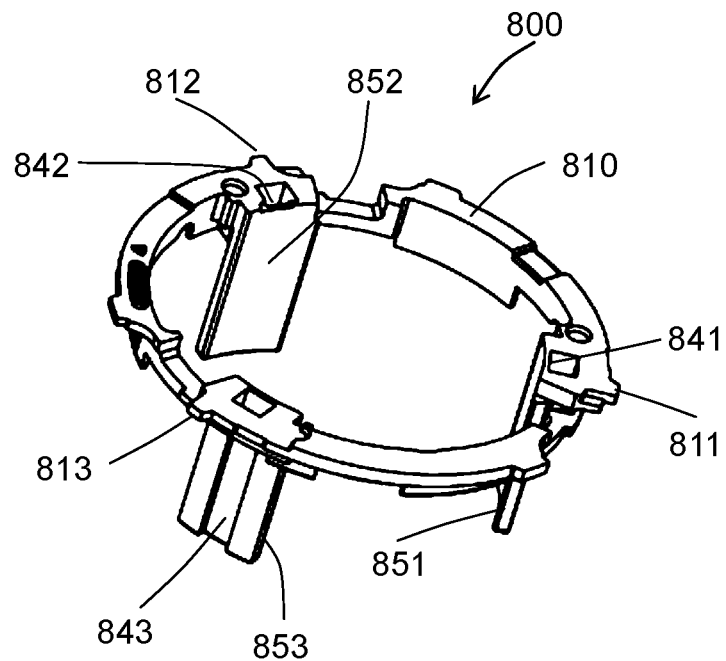
FIG. 6A is a perspective view of rotation restricting frame 800 as seen from the lens mount 900 side in accordance with the first exemplary embodiment.
Figure 6B:
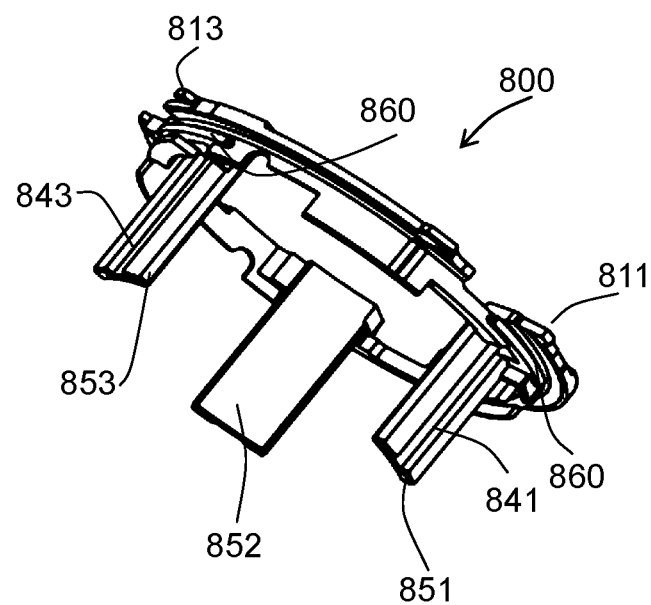
FIG. 6B is a perspective view of rotation restricting frame 800 as seen from the object side in accordance with the first exemplary embodiment.

FIG. 6A is a perspective view of rotation restricting frame 800 as seen from the lens mount 900 side. FIG. 6B is a perspective view of rotation restricting frame 800 as seen from the object side. Rotation restricting frame 800 includes rotation restricting key 811, rotation restricting key 812, and rotation restricting key 813 radially projecting from flange 810 on the outer peripheral side. Three rotation restricting keys 811, 812, 813 are disposed in the positions where the outer periphery is divided into substantially equal three phases along the outer peripheral direction. Rotation restricting keys 811, 812, 813 engage fixed frame rotation restricting grooves 211, 212, 213, respectively, in fixed frame 200. This configuration restricts rotation restricting frame 800 to rotate relative to fixed frame 200 around the optical axis and allows the rotation restricting frame to move along the optical axis direction.

Rotation restricting frame 800 has second group rotation restricting rib 851, second group rotation restricting rib 852, and second group rotation restricting rib 853 each having a fixed width and formed along the optical axis direction. Second group rotation restricting ribs 851, 852, 853 project from the inner peripheral side of flange 810 to the object side. Second group rotation restricting ribs 851, 852, 853 are substantially in phase with rotation restricting keys 811, 812, 813, respectively, in the positions along the peripheral direction. Second group rotation restricting ribs 851, 852, 853 project from flange 810 and thus are easily flexible.

On the outer peripheral sides of second group rotation restricting ribs 851, 852, 853, first group rotation restricting groove 841, first group rotation restricting groove 842, and first group rotation restricting groove 843 are disposed, respectively, so that each first group rotation restricting groove has a substantially fixed width and is formed parallel to the optical axis. As shown in FIG. 6A, first group rotation restricting grooves 841, 842, 843 are formed over the entire lengths of second group rotation restricting ribs 851, 852, 853, respectively, and penetrate through flange 810.

Here, second group rotation restricting ribs 851, 852, 853 engage second group rotation restricting grooves 751, 752, 753, respectively, in second group lens unit 700. First group rotation restricting grooves 841, 842, 843 engage first group rotation restricting ribs 641, 642, 643 in first group lens unit 600, respectively. With this configuration, first group lens unit 600 and second group lens unit 700 are movably guided to the optical axis direction while rotation of the first and second group lens units relative to rotation restricting frame 800 is restricted around the optical axis.

On the outer periphery of rotation restricting frame 800, three bayonet keys 860 are disposed. Three bayonet keys 860 engage three bayonet grooves 560, respectively, in cam cylinder 500. This configuration allows rotation restricting frame 800 to rotate relative to cam cylinder 500 and restricts the rotation restricting frame to move along the optical axis direction. Rotation restricting frame 800 is an example of a guide frame.

Third/fourth group lens unit 300 shown in FIG. 1 is mounted in fixed frame 200. Third lens group G3, i.e. a focusing lens, is mounted in third/fourth group lens unit 300. A focus motor, for example, for operating third lens group G3 is fixed to third/fourth group lens unit 300. As a fixed lens, fourth lens group G4 is mounted in third/fourth group lens unit 300.

Rear frame 400 shown in FIG. 1 is fixed to fixed frame 200 and disposed on the outer peripheral side of fixed frame 200.

Lens mount 900 shown in FIG. 1 is a mount part to be connected to a camera body. Lens mount 900 is fixed to fixed frame 200.

[2. Assembly of Interchangeable Lens]

Next, a description is provided for the order of assembling an interchangeable lens.

First, cam cylinder 500 is inserted into fixed frame 200. At this time, first cam pin 501, second cam pin 502, and through cam pin 503 of cam cylinder 500 are attached to first cam groove 201, second cam groove 202, and through cam groove 203, respectively, in fixed frame 200. Zoom drive pin 504 is screwed to through cam pin 503.

Next, first group lens unit 600 is inserted into cam cylinder 500. At this time, third cam pins 621, 622, 623 of first group lens unit 600 are attached to three third cam grooves 520, respectively, in cam cylinder 500.

Next, second group lens unit 700 is inserted into cam cylinder 500. At this time, fourth cam pins 731, 732, 733 of second group lens unit 700 are attached to three fourth cam grooves 530, respectively, in cam cylinder 500.

Next, rotation restricting frame 800 is inserted into cam cylinder 500. At this time, second group rotation restricting ribs 851, 852, 853 of rotation restricting frame 800 engages second group rotation restricting grooves 751, 752, 753, respectively, in second group lens unit 700. First group rotation restricting ribs 841, 842, 843 of rotation restricting frame 800 engage first group rotation restricting ribs 641, 642, 643, respectively, in first group lens unit 600. Further, three bayonet keys 860 in rotation restricting frame 800 engage three bayonet grooves 560, respectively, in cam cylinder 500.

Thus, cam cylinder 500, first group lens unit 600, second group lens unit 700, and rotation restricting frame 800 are inserted into fixed frame 200.

Next, third/fourth group lens unit 300 is fixed to the lens mount 900 side of fixed frame 200 by screwing.

Next, zoom ring 100 is fixed to the outer periphery of fixed frame 200. At this time, zoom drive pin 504 of cam cylinder 500 engages zoom drive groove 104 of zoom ring 100.

Rear frame 400 is fixed to the lens mount 900 side of fixed frame 200 by screwing, and lens mount 900 is fixed to fixed frame 200 by screwing.

In the interchangeable lens thus assembled, the following operation is performed. When zoom ring 100 rotates, cam cylinder 500 rotates relative to fixed frame 200 and moves to the optical axis direction. Rotation restricting frame 800 moves to the optical axis direction along with cam cylinder 500, in the state in which rotation relative to fixed frame 200 around the optical axis is restricted. First group lens unit 600 and second group lens unit 700 move relative to cam cylinder 500 to the optical axis direction, in the state in which rotation around the optical axis is restricted.

[3. Relation between configurations (FIG. 7 through FIG. 10)]

Figure 7:
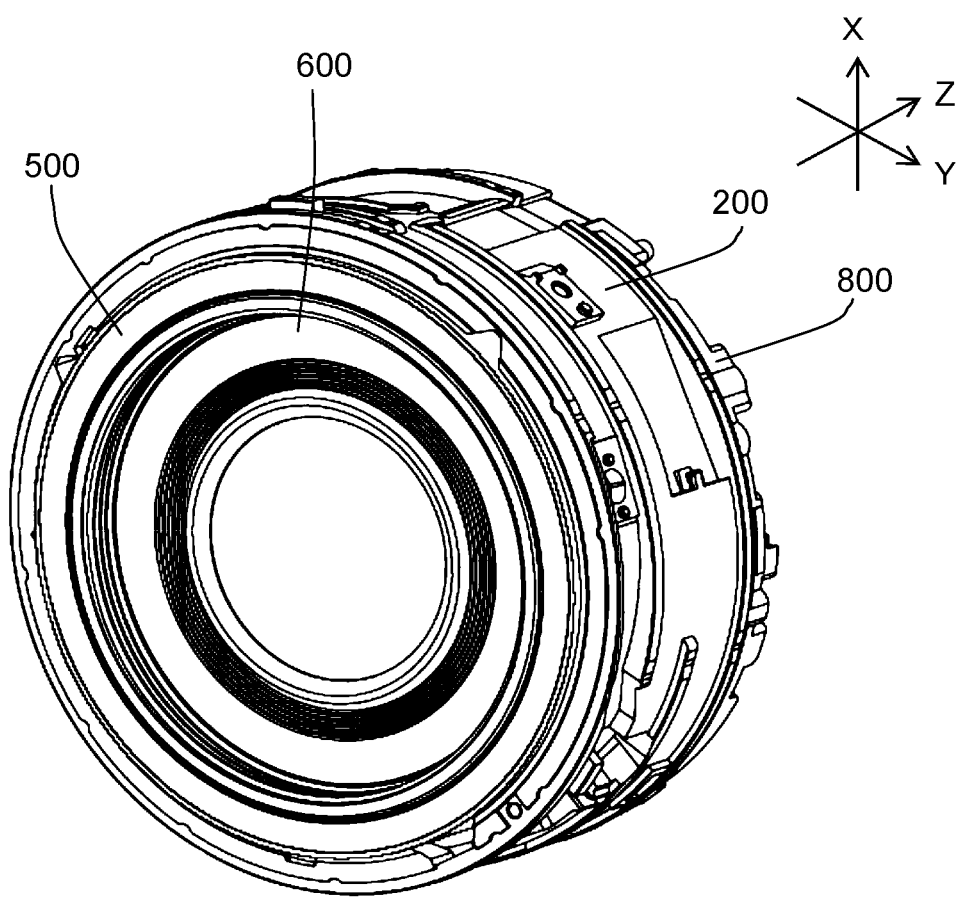
FIG. 7 is a perspective view in a state in which fixed frame 200, cam cylinder 500, first group lens unit 600, second group lens unit 700, and rotation restricting frame 800 are assembled in accordance with the first exemplary embodiment.

FIG. 7 is a perspective view in the state in which fixed frame 200, cam cylinder 500, first group lens unit 600, second group lens unit 700, and rotation restricting frame 800 are assembled.

Figure 8:
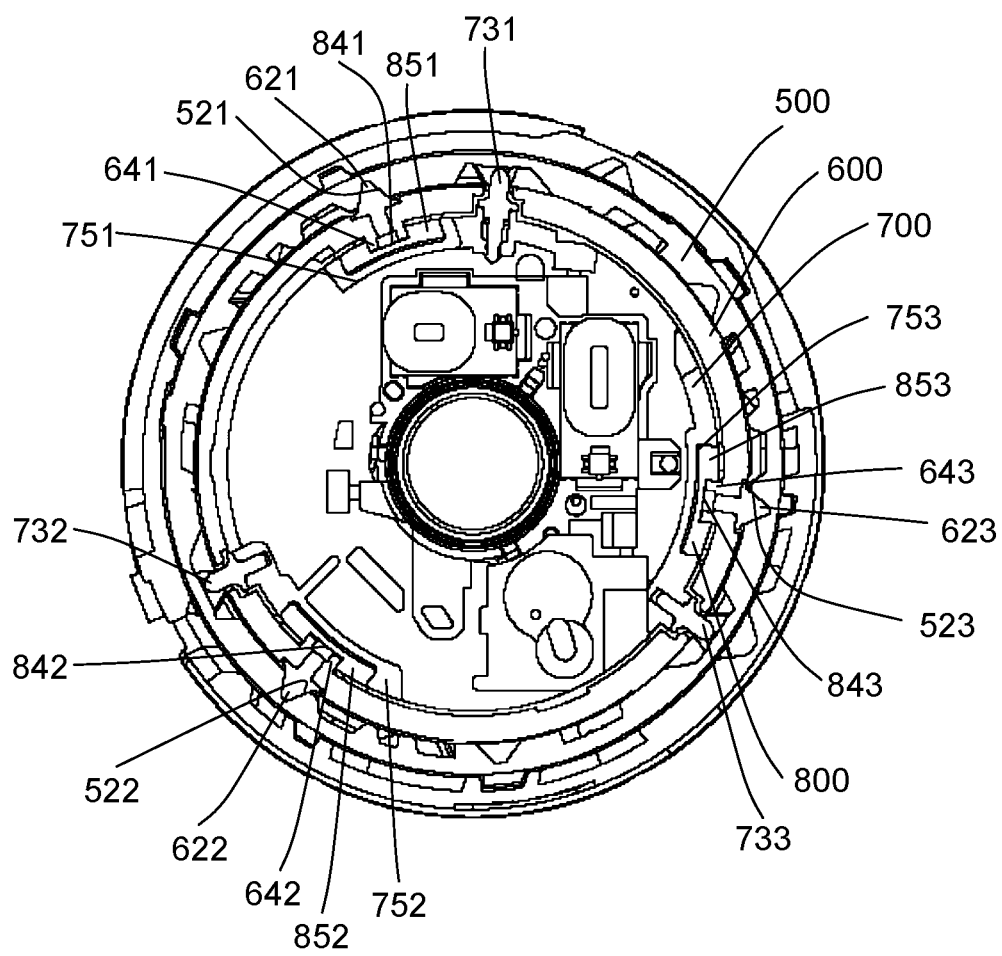
FIG. 8 is a schematic view showing a cross-section in the direction orthogonal to an optical axis of FIG. 7.

FIG. 8 is a schematic view showing a cross-section in the direction (XY direction) orthogonal to the optical axis in FIG. 7. In FIG. 8, three third cam grooves 520 engaging third cam pins 621, 622, 623 are expressed as third cam groove 521, third cam groove 522, and third cam groove 523, respectively. As shown in FIG. 8, third cam grooves 521, 522, 523, third cam pins 621, 622, 623, first group rotation restricting ribs 641, 642, 643, second group rotation restricting grooves 751, 752, 753, first group rotation restricting grooves 841, 842, 843, second group rotation restricting ribs 851, 852, 853, and fourth cam pins 731, 732, 733 are disposed in the positions where the peripheral direction is divided into substantially equal three phases. Third cam groove 521, third cam pin 621, first group rotation restricting rib 641, second group rotation restricting groove 751, first group rotation restricting groove 841, and second group rotation restricting rib 851 are disposed in substantially the same phase position along the peripheral direction. Similarly, third cam groove 522, third cam pin 622, first group rotation restricting rib 642, second group rotation restricting groove 752, first group rotation restricting groove 842, and second group rotation restricting rib 852 are disposed in substantially the same phase position along the peripheral direction. Third cam groove 523, third cam pin 623, first group rotation restricting rib 643, second group rotation restricting groove 753, first group rotation restricting groove 843, and second group rotation restricting rib 853 are disposed in substantially the same phase position along the peripheral direction.

Fourth cam pins 731, 732, 733 are disposed on the wall of second group lens unit 700 that forms second group rotation restricting grooves 751, 752, 753, and thus disposed in the vicinity of third cam pins 621, 622, 623, respectively. Since the distance between third cam pin 621 and fourth cam pin 731 are as short as possible, the distance between the power point and the point of action of the load is short. This configuration reduces the pinching load in the portion where rotation restricting key 811 engages fixed frame rotation restricting groove 211. The relation between third cam pin 622 and fourth cam pin 732, and the relation between third cam pin 623 and fourth cam pin 733 are the same as the above.

Figure 9B:
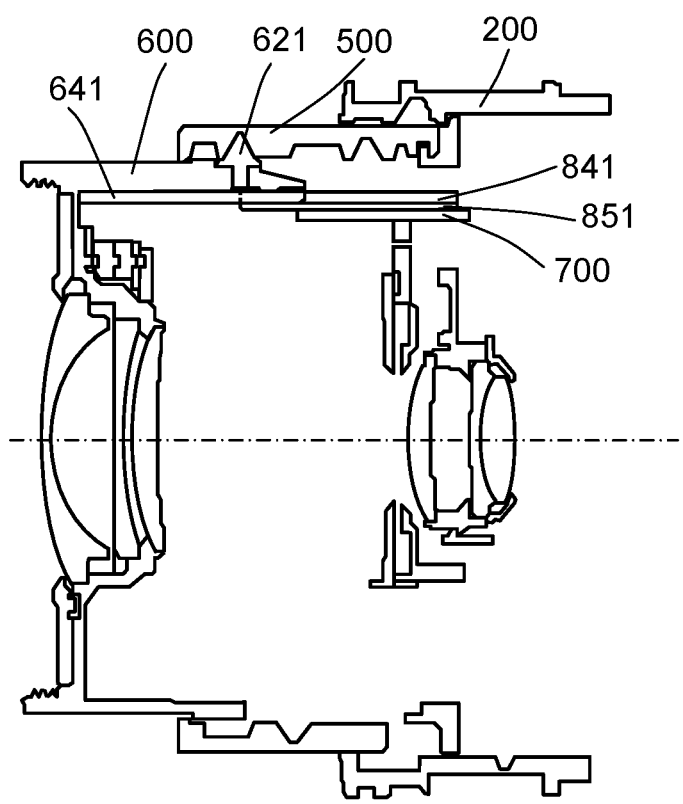
FIG. 9B is a schematic view showing a section along the optical axis direction in FIG. 7 in the state in which lenses are used.
Figure 10:
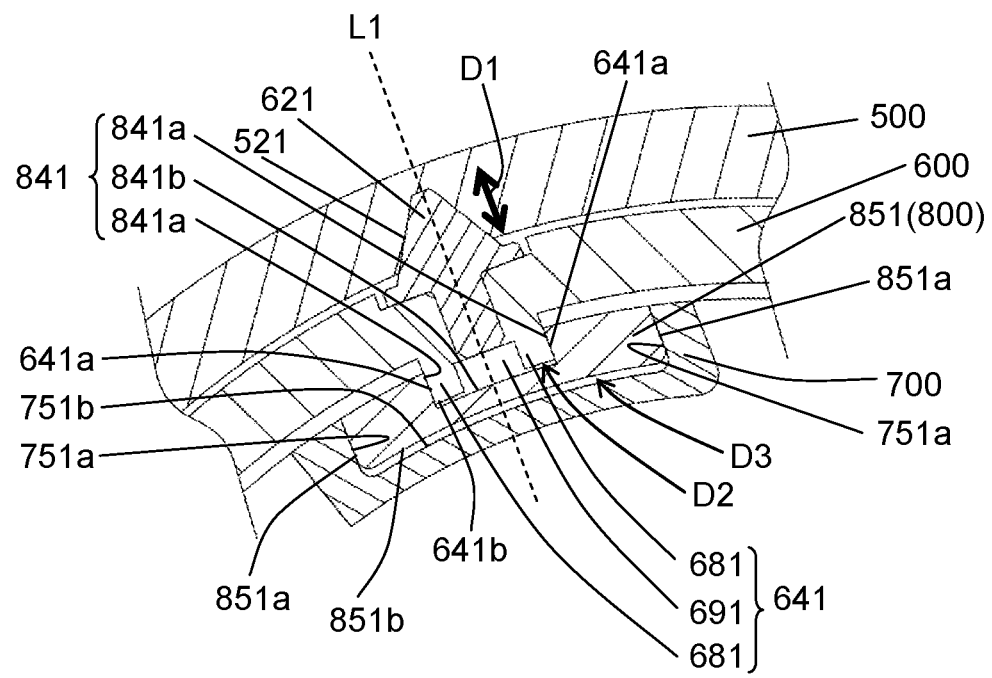
FIG. 10 is an enlarged cross-sectional view of the vicinity of third cam pin 621 in FIG. 8.

FIG. 9A is a schematic view showing a section along the optical axis direction (in the Z direction) of FIG. 7 in the state in which lenses are stored. FIG. 9B is a schematic view showing a section along the optical axis direction (in the Z direction) of FIG. 7 in the state in which lenses are used. In the state in which lenses are stored as shown in FIG. 9A, first group rotation restricting rib 641 engaging first group rotation restricting groove 841 is stored to the end of the image surface side of second group rotation restricting rib 851 in the optical axis direction. In the state in which lenses are store as shown in FIG. 9B, third cam pin 621 moves to the vicinity of the end of the object side of first group rotation restricting groove 841 (second group rotation restricting rib 851) along the optical axis direction. Third cam pin 622, first group rotation restricting rib 642, first group rotation restricting groove 842, and second group rotation restricting rib 852 perform the similar operation. Third cam pin 623, first group rotation restricting rib 643, first group rotation restricting groove 843, and second group rotation restricting rib 853 perform the similar operation FIG. 10 is an enlarged view of the vicinity of third cam pin 621 in FIG. 8. From the outer peripheral side to the inner peripheral side, cam cylinder 500, first group lens unit 600, rotation restricting frame 800, and second group lens unit 700 are disposed.

Cam cylinder 500 has third cam groove 521 on the inner peripheral surface. First group lens unit 600 has third cam pin 621 on the outer peripheral surface. Third cam pin 621 engages third cam groove 521.

Third cam pin 621 is press-fit at the end of the image surface side of the body of first group lens unit 600. First group lens unit 600 has first group rotation restricting rib 641 in the inner peripheral position opposite third cam pin 621 in the radial direction. First group rotation restricting rib 641 has two protrusion parts 681 and one recess part 691 interposed between two protrusion parts 681. Each of protrusion parts 681 has contact surface 641a on the side opposite recess part 691 and inner peripheral surface 641b connecting contact surface 641a and recess part 691. Recess part 691 is a "reduced thickness part" and reduces "sink" in the resin that forms first group lens unit 600. First group lens unit 600 is an external member made of resin. Thus, without recess part 691, i.e. a reduced thickness part, the resin sinks and has an uneven surface. This phenomenon can impair the slidability or design (appearance). Similar phenomenon can occur in third cam pins 622, 623 and first group rotation restricting ribs 642, 643.

As shown in FIG. 10, second group rotation restricting rib 851 of rotation restricting frame 800 includes first group rotation restricting groove 841 having a substantially recessed sectional shape. First group rotation restricting groove 841 has two sliding surfaces 841a and bottom surface 841b connecting two sliding surfaces 841a. Two sliding surfaces 841a are movable in contact with contact surfaces 641a of first group rotation restricting rib 641. Two sliding surfaces 841a make contact with contact surfaces 641a substantially parallel to the radial direction (L1). This operation prevents rotation restricting frame 800 from falling off from first group lens unit 600.

Second group rotation restricting rib 851 has two contact surfaces 851a and inner peripheral surface 851b connecting two contact surfaces 851a.

Second group lens unit 700 has second group rotation restricting groove 751 on the outer peripheral surface thereof. Second group rotation restricting groove 751 has a recessed shape, and has two sliding surfaces 751a, and bottom surface 751b connecting two sliding surfaces 751a. Two sliding surfaces 751a are movable in contact with two contact surfaces 851a of second group rotation restricting rib 851. Sliding surfaces 751a make contact with contact surfaces 851a substantially parallel to the radial direction (L1). This operation prevents second group lens unit 700 from falling off from rotation restricting frame 800.

Here, as shown in FIG. 10, third cam groove 521 of cam cylinder 500 engages third cam pin 621 of first group lens unit 600. Thereby, cam cylinder 500 and first group lens unit 600 have an engagement relation of distance D1 in the radial direction (L1). In relation with rotation restricting frame 800, first group lens unit 600 has a space of distance D2 in the radial direction. That is, distance D2 is the distance between inner peripheral surface 641b of first group rotation restricting rib 641 and bottom surface 841b of first group rotation restricting groove 841. In relation with second group lens unit 700, rotation restricting rib 800 has a space of distance D3 in the radial direction. That is, distance D3 is the distance between inner peripheral surface 851b of second group rotation restricting rib 851 and bottom surface 751b of second group rotation restricting groove 751.

In order to prevent third cam pin 621 of first group lens unit 600 from falling off from third cam groove 521 of cam cylinder 500, the following expression is satisfied:

$$D1 > D2 + D3 \tag{1}$$

Further, as shown in FIG. 10, from the outer peripheral side, third cam pin 621 engages third cam groove 521, first group rotation restricting groove 841 engages first group rotation restricting rib 641, and second group rotation restricting groove 751 engages second group rotation restricting rib 851. When first group lens unit 60 is depressed to the inner peripheral side, first group lens unit 600 supports rotation restricting frame 800, and rotation restricting frame 800 supports second group lens unit 700. This configuration enhances the impact resistance of the lens barrel. Contact surfaces 851a of second group rotation restricting rib 851 restrict rotation of second group lens unit 700, and first group rotation restricting groove 841 formed on the outer peripheral side restricts rotations of first group lens unit 600. Thus, restricting rotation of two members at the same time contributes to size reduction of the lens barrel.

Here, as shown in FIG. 10, the peripheral width of sliding surface 841a is smaller than the peripheral width of contact surface 851a.

The above description is provided for the configuration in the vicinity of third cam pin 621. The configuration of first group rotation restricting rib 642, second group rotation restricting groove 752, first group rotation restricting groove 842, and second group rotation restricting rib 852 in the vicinity of third cam pin 622 is similar to the above. The configuration of first group rotation restricting rib 643, second group rotation restricting groove 753, first group rotation restricting groove 843, and second group rotation restricting rib 853 in the vicinity of third cam pin 623 is similar to the above.

[4. Variation (FIG. 11)]

Figure 11:
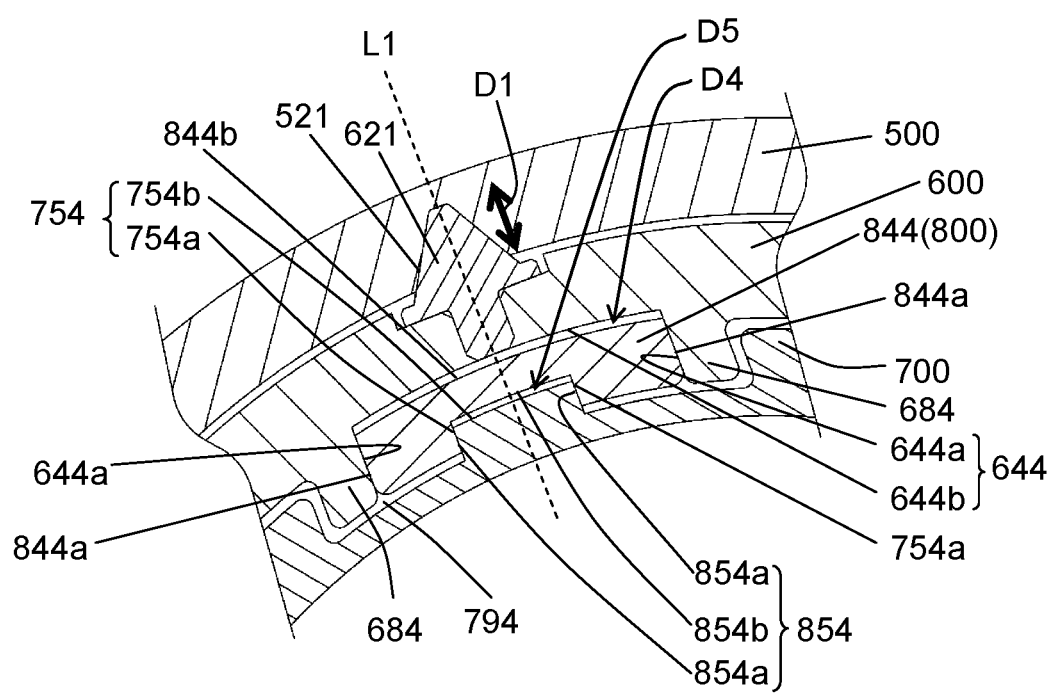
FIG. 11 is an enlarged cross-sectional view of the vicinity of third cam pin 621 in a variation of the first exemplary embodiment.

FIG. 11 is an enlarged view of the vicinity of third cam pin 621 in the variation. From the outer peripheral side to the inner peripheral side, cam cylinder 500, first group lens unit 600, rotation restricting frame 800, and second group lens unit 700 are disposed. Cam cylinder 500 has third cam groove 521 on the inner peripheral surface. First group lens unit 600 has third cam pin 621 on the outer peripheral surface. Third cam pin 621 engages third cam groove 521. The above points are the same as those in FIG. 10. However, the variation differs from the configuration of FIG. 10 in that the relation between the rotation restricting ribs and the rotation restricting grooves disposed in first group lens unit 600, second group lens unit 700, and rotation restricting frame 800 is opposite.

That is, first group lens unit 600 has first group rotation restricting groove 644 in the position along the inner periphery opposite third cam pin 621 in the radial direction. First group rotation restricting groove 644 is a part interposed between protrusion parts 684, and has two sliding surfaces 644a and bottom surface 644b connecting two sliding surfaces 644a. First group rotation restricting groove 644 is disposed substantially parallel to the optical axis direction similarly to recess part 691 of first group rotation restricting rib 641 shown in FIG. 10.

As shown in FIG. 11, rotation restricting frame 800 includes first group rotation restricting rib 844, and second group rotation restricting groove 854 disposed on the inner peripheral side of first group rotation restricting rib 844. First group rotation restricting rib 844 includes two contact surfaces 844a and outer peripheral surface 844b connecting two contact surfaces 844a, and engages first group rotation restricting groove 644 of first group lens unit 600. That is, two contact surfaces 844a are movable in contact with sliding surfaces 644a of first group rotation restricting groove 644. Second group rotation restricting groove 854 includes two sliding surfaces 854a and bottom surface 854b connecting two sliding surfaces 854a.

Second group lens unit 700 includes recess parts 794 on the outer peripheral surface, and second group rotation restricting ribs 754 formed on the outer peripheral side of recess parts 794. Second group rotation restricting rib 754 has a protruding shape, and includes two contact surfaces 754a and outer peripheral surface 754b connecting two contact surfaces 754a. Second group rotation restricting rib 754 engages second group rotation restricting groove 854. That is, contact surface 754a is movable in contact with sliding surfaces 854a of second group rotation restricting groove 854.

Here, as shown in FIG. 11, third cam groove 521 of cam cylinder 500 engages third cam pin 621 of first group lens unit 600. Thereby, cam cylinder 500 and first group lens unit 600 has an engagement relation of distance D1 in the radial direction (L1). In relation with rotation restricting frame 800, first group lens unit 600 has a space of distance D4 in the radial direction.

That is, distance D4 is the distance between bottom surface 644b of first group rotation restricting rib 644 and outer peripheral surface 844b of first group rotation restricting rib 844. In relation with second group lens unit 700, rotation restricting rib 800 has a space of distance D5 in the radial direction. That is, distance D5 is the distance between bottom surface 854b of second group rotation restricting groove 854 and outer peripheral surface 754b of second group rotation restricting rib 754.

In order to prevent third cam pin 621 of first group lens unit 600 from falling off from third cam groove 521 of cam cylinder 500, following expression (2) is satisfied:

$$D1 > D4 + D5 \quad (2)$$

Further, as shown in FIG. 11, from the outer peripheral side, third cam pin 621 engages third cam groove 521, first group rotation restricting rib 844 engages first group rotation restricting groove 644, and second group rotation restricting rib 754 engages second group rotation restricting groove 854. When first group lens unit 600 is depressed to the inner peripheral side, first group lens unit 600 supports rotation restricting frame 800, and rotation restricting frame 800 supports second group lens unit 700. This configuration enhances the impact resistance of the lens barrel. Contact surfaces 844a of first group rotation restricting rib 844 restrict rotation of first group lens unit 600, and second group rotation restricting groove 854 formed on the inner peripheral side restricts rotation of second group lens unit 700. Thus, restricting rotation of two members at the same time contributes to size reduction of the lens barrel.

Here, as shown in FIG. 11, the peripheral width of contact surface 844a is larger than the peripheral width of sliding surface 854a.

The above description is provided for the configuration in the vicinity of third cam pin 621 in the variation. The configuration of the first group rotation restricting groove, the protrusion part, the second group rotation restricting rib, the recess part, the first group rotation restricting rib, and the second group rotation restricting groove in the vicinity of third cam pin 622 is similar to the above. The configuration of the first group rotation restricting groove, the protrusion part, the second group rotation restricting rib, the recess part, the first group rotation restricting rib, and the second group rotation restricting groove in the vicinity of third cam pin 623 is similar to the above.

First group rotation restricting groove 644 and second group rotation restricting rib 754 are examples of guide parts.

[5. Summary]

As described above, a rotation restricting rib having a rotation restricting groove (e.g. second group rotation restricting rib 851 and first group rotation restricting rib 844) disposed inside the barrel can restrict rotation of second group lens unit 700 and restrict rotation of first group lens unit 600. This configuration can reduce the number of components in the radial direction of the lens barrel and reduce the diameter of the lens barrel.

Third cam pin 621 and fourth cam pin 731 engaging cam cylinder 500 are positioned substantially in phase with each other. That is, third cam pin 621 is in the vicinity of fourth cam pin 731 in the peripheral direction. This configuration can reduce the distance between the power point and the point of action of the load, thus reducing the pinching load. As a result, even a small lens barrel can perform smooth operation.

For instance, the rotation operation of cam cylinder 500 exerts a load on third cam pin 621 and fourth cam pin 731 in the peripheral direction. In the exemplary embodiment shown in FIG. 10, the load on third cam pin 621 is transferred to first group rotation restricting groove 841 and second group rotation restricting rib 851 via first group rotation restricting rib 641. In contrast, the load on fourth cam pin 731 is transferred to second group rotation restricting rib 851 via second group rotation restricting groove 751. Cam cylinder 500 rotates relative to fixed frame 200, and the rotation force transferred to second group rotation restricting rib 851 is transferred to the portion where rotation restricting key 811 engages fixed frame rotation restricting groove 211.

In the variation shown in FIG. 11, the load on third cam pin 621 is transferred to first group rotation restricting rib 844 and second group rotation restricting groove 854 via first group rotation restricting groove 644. In contrast, the load on fourth cam pin 731 is transferred to second group rotation restricting groove 854 via second group rotation restricting rib 754. Cam cylinder 500 rotates relative to fixed frame 200, and the rotation force transferred to second group rotation restricting groove 854 is transferred to the portion where rotation restricting key 811 engages fixed frame rotation restricting groove 211.

Since the distance between third cam pin 621 and fourth cam pin 731 are as short as possible in this manner in this exemplary embodiment, the distance between the power point and the point of action of the load is short. This configuration reduces the pinching load in the portion where rotation restricting key 811 engages fixed frame rotation restricting groove 211. The relation between third cam pin 622 and fourth cam pin 732, and the relation between third cam pin 623 and fourth cam pin 733 are the same as the above.

Further, when an external force is given by the impact from the object side to the lens barrel, breakage of the lens barrel is reduced. For instance, suppose first group lens unit 600 deforms in the direction in which third cam pin 621 falls off from third cam groove 521, i.e. toward the inside of the lens barrel. In this case, in the exemplary embodiment shown in FIG. 10, inner peripheral surface 641b of first group rotation restricting rib 641 makes contact with bottom surface 841b of first group rotation restricting groove 841, and inner peripheral surface 851b of second group rotation restricting rib 851 makes contact with bottom surface 751b of second group rotation restricting groove 751. In the variation shown in FIG. 11, bottom surface 644b of first group rotation restricting grove 644 makes contact with outer peripheral surface 844b of first group rotation restricting rib 844, and bottom surface 854b of second group rotation restricting groove 854 makes contact with outer peripheral surface 754b of second group rotation restricting rib 754. With this operation, rotation restricting frame 800 and second group lens unit 700 prevent deformation of first group lens unit 600; thus a lens barrel having high impact resistance can be achieved. That is, even a thin and less strong rib construction like rotation restricting frame 800 can ensure the impact resistance of the lens barrel by disposing rotation restricting frame 800 between first group lens unit 600 and second group lens unit 700.

First group rotation restricting groove 841 extends to the position substantially equal to the position of rotation restricting key 811 in the optical axis direction. With this configuration, even first group lens unit 600 moves relative to rotation restricting frame 800 along the optical axis direction, the large contact area between first group rotation restricting rib 641 and first group rotation restricting groove 841 can be ensured while the length in a collapsed state is kept short. This configuration can achieve a lens barrel having a higher impact resistance. The relation between first group rotation restricting rib 642 and first group rotation restricting groove 842, and the relation between first group rotation restricting rib 643 and first group rotation restricting groove 843 are the same as above.

When first group rotation restricting groove 841 is extended in the radial direction, a cam pin having a higher strength can be configured even in the following case. For instance, third cam pin 621 is a component separate from first group lens unit 600 and is fixed to first group lens unit 600 by press-fitting, for example, the press-fitting margin can be ensured to first group rotation restricting rib 641 in the radial direction. The relation between third cam pin 622 and first group rotation restricting rib 642 and the relation between third cam pin 623 and first group rotation restricting rib 643 are the same as the above.

Second Exemplary Embodiment

Figure 12:
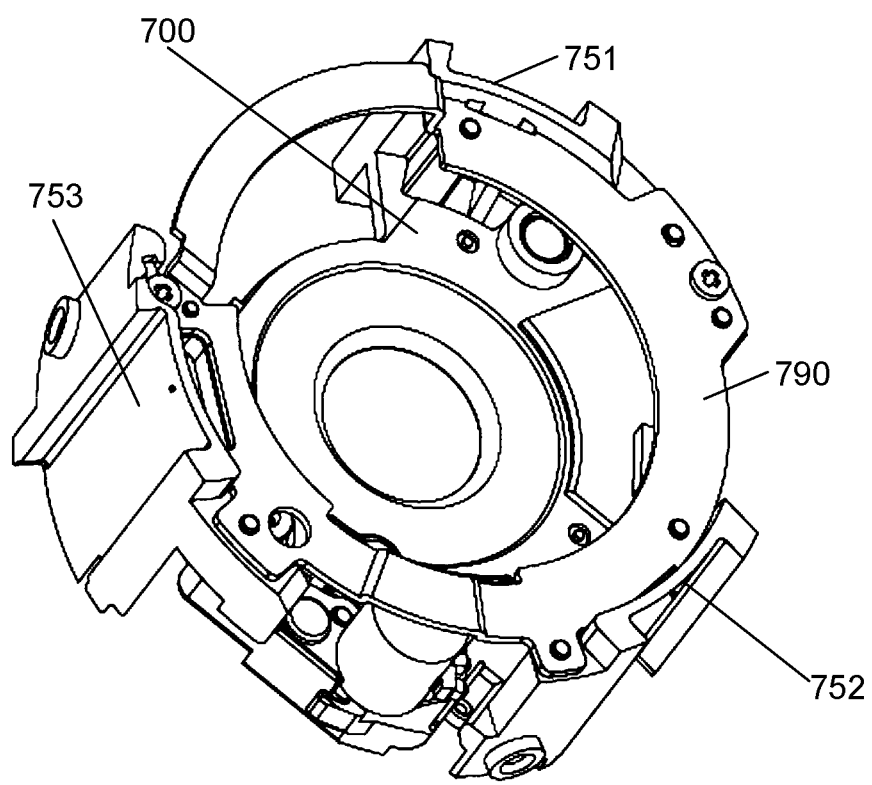
FIG. 12 is a perspective view showing a configuration where metal member 790 is fixed to second group lens unit 700 in accordance with a second exemplary embodiment.

FIG. 12 is a perspective view showing a configuration where metal member 790 is fixed to second group lens unit 700. Metal member 790 is disposed inside second group lens unit 700 shown in FIG. 5, at the end of the object side. Metal member 790 is disposed on the inner peripheral side of the protrusions where three second group rotation restricting grooves 751, 752, 753 are formed, and is positioned and screwed to the positions. For instance, metal member 790 is configured of aluminum, SUS (stainless steel) or brass. Metal member 790 is provided in order to prevent second group rotation restricting grooves 751, 752, 753 from flexing to the inner peripheral side. Metal member 790 reduces the flexion of second group rotation restricting grooves 751, 752, 753 to the inner peripheral side and enhances the impact resistance of second group lens unit 700 and the lens barrel.

Other Exemplary Embodiments

The description of the exemplary embodiments has been presented as examples of the technique disclosed in the present invention. However, the technique of the present disclosure is not limited to the above. The technique of the present disclosure is applicable to other exemplary embodiments subjected to modifications, replacements, additions, omissions, or the like as needed.

For instance, in the first exemplary embodiment, three sets of the third cam groove, fourth cam groove, third cam pin, fourth cam pin, fixed frame rotation restricting groove, first group rotation restricting groove, second group rotation restricting groove, first group rotation restricting rib, second group rotation restricting rib, and rotation restricting key are disposed in substantially equidistant positions along the peripheral direction, but the configuration is not limited to the above. These elements do not need to be disposed in equidistant positions along the peripheral direction. The number of sets is not limited to three, may be one or two, or more than four. It is only necessary that these elements can support each lens group movably with high precision.

The exemplary embodiments have been described as examples of the technique of the present disclosure. For this purpose, the accompanying drawings and detailed description are provided.

Therefore, elements shown in the accompanying drawings and the detailed description may include not only essential elements necessary for solving the problem, but also non-essential elements that do not have to be used for solving the problem and are only used for showing the examples of the above technique. For this reason, these non-essential elements should not be instantly construed as essential elements simply because these elements are shown in the accompanying drawings and the detailed description.

Further, the above exemplary embodiments are intended to give examples of the technique of the present disclosure, and thus can be subjected to various modifications, replacements, additions, omissions, or the like within the scope of the claims or within the equivalent scope.

INDUSTRIAL APPLICABILITY

The present disclosure is applicable to a lens barrel, and an imaging apparatus including a lens barrel. Specifically, the present disclosure is applicable to the lens barrel for use in a digital still camera or movie camera, a portable phone or smartphone with a camera function, or the like. The present disclosure is also applicable to an interchangeable lens for use in a single-lens reflex camera, a mirror-less camera, or the like.

REFERENCE MARKS IN THE DRAWINGS

G1 First lens group
G2 Second lens group

G3 Third lens group
G4 Fourth lens group
100 Zoom ring
104 Zoom drive groove
200 Fixed frame
201 First cam groove
202 Second cam groove
203 Through cam groove
211, 212, 213 Fixed frame rotation restricting groove
300 ¾ group lens unit
400 Rear frame
500 Cam cylinder
501 First cam pin
502 Second cam pin
503 Through cam pin
504 Zoom drive pin
520, 521, 522, 523 Third cam groove
530 Fourth cam groove
560 Bayonet groove
600 First group lens unit
621, 622, 623 Third cam pin
641, 642, 643, 844 First group rotation restricting rib
644, 841, 842, 843 First group rotation restricting groove
681, 684 Protrusion part
691, 794 Recess part
700 Second group lens unit
731, 732, 733 Fourth cam pin
751, 752, 753, 854 Second group rotation restricting groove
754, 851, 852, 853 Second group rotation restricting rib
790 Metal member
800 Rotation restricting frame
810 Flange
811, 812, 813 Rotation restricting key
860 Bayonet key
900 Lens mount

The invention claimed is:

1. A lens barrel comprising:
a guide frame including a rotation restricting rib having a groove along an optical axis direction on a surface in a radial direction;
a first frame including a guide rib engaged with the groove of the rotation restricting rib, relative rotation of the first frame being restricted by the rotation restricting rib, the first frame capable of moving along the optical axis direction; and
a second frame, separate from the first frame, including a guide groove engaged outside the rotation restricting rib in a circumferential direction, relative rotation of the second frame being restricted by the rotation restricting rib, the second frame capable of moving along the optical axis direction.

2. The lens barrel of claim 1, further comprising:
a first cam pin; and
a cam cylinder disposed on an outside in the radial direction of one frame of the first frame and the second frame disposed on the outside in the radial direction with respect to the rotation restricting rib,
wherein the cam cylinder and a surface of the outside in the radial direction of the one frame are engaged by the first cam pin.

3. The lens barrel of claim 2, wherein the rotation restricting rib, the guide rib, the guide groove, and the first cam pin are disposed substantially in phase with each other.

4. The lens barrel of claim 2, further comprising:
a second cam pin disposed on a surface of the outside in the radial direction of one guide part of the guide rib and the guide groove, and disposed in the vicinity of the first cam pin in the circumferential direction, wherein
the one guide part is disposed on an inside in the radial direction with respect to the rotation restricting rib,
the first cam pin and the one guide part are disposed substantially in phase with each other, and
the second cam pin engages the cam cylinder.

5. The lens barrel of claim 1, wherein
the guide rib of the first frame is inside of the groove of the rotation restriction rib.

6. The lens barrel of claim 1, wherein
the groove of the rotation restricting rib has two sliding surfaces and a bottom surface connecting the two sliding surfaces, and the two sliding surfaces are movable in contact with contact surfaces of the guide rib of the first frame.

7. The lens barrel of claim 6, wherein
the two sliding surfaces contact with the contact surfaces substantially parallel to the radial direction.

* * * * *